(12) United States Patent
Massey

(10) Patent No.: US 8,950,696 B2
(45) Date of Patent: Feb. 10, 2015

(54) AERIAL SPRAYING APPARATUS

(71) Applicant: George N. Massey, Valley Center, KS (US)

(72) Inventor: George N. Massey, Valley Center, KS (US)

(73) Assignee: Johnson Airspray, Inc., Argyle, MN (US)

( * ) Notice: Subject to any disclaimer, the term of this patent is extended or adjusted under 35 U.S.C. 154(b) by 372 days.

(21) Appl. No.: 13/622,447

(22) Filed: Sep. 19, 2012

(65) Prior Publication Data

US 2013/0068862 A1 Mar. 21, 2013

Related U.S. Application Data

(60) Provisional application No. 61/536,724, filed on Sep. 20, 2011.

(51) Int. Cl.
| | |
|---|---|
| *B05B 5/043* | (2006.01) |
| *B05B 5/025* | (2006.01) |
| *B05B 1/20* | (2006.01) |
| *B64D 1/18* | (2006.01) |
| *B05B 5/00* | (2006.01) |
| *B05B 5/053* | (2006.01) |
| *B05B 5/08* | (2006.01) |
| *B05B 1/06* | (2006.01) |

(52) U.S. Cl.
CPC ............... *B05B 5/043* (2013.01); *B05B 5/003* (2013.01); *B05B 5/0533* (2013.01); *B05B 5/085* (2013.01); *B05B 1/06* (2013.01); *B64D 1/18* (2013.01)
USPC ........ 239/690.1; 239/159; 239/163; 239/171; 239/690; 239/695

(58) Field of Classification Search
USPC .......... 239/3, 159, 163, 171, 690, 690.1, 691, 239/695, 697, 706–708; 244/136
See application file for complete search history.

(56) References Cited

U.S. PATENT DOCUMENTS

| | | | |
|---|---|---|---|
| 3,339,840 A | | 9/1967 | Point |
| 3,802,625 A | | 4/1974 | Buser et al. |
| 4,328,940 A | * | 5/1982 | Malcolm ....................... 244/136 |
| 4,560,107 A | | 12/1985 | Inculet |
| 4,664,340 A | * | 5/1987 | Jackson ....................... 244/76 R |
| 4,703,891 A | * | 11/1987 | Jackson et al. ................ 239/171 |
| 5,042,723 A | * | 8/1991 | Grocott et al. ................ 239/704 |
| 5,402,723 A | | 4/1995 | Friedrichs et al. |
| 5,975,425 A | | 11/1999 | Carlton |

* cited by examiner

*Primary Examiner* — Darren W Gorman
(74) *Attorney, Agent, or Firm* — DuFault Law Firm, P.C.; Dustin R. DuFault

(57) ABSTRACT

An apparatus for spraying and inducing an electrostatic charge upon a liquid in excess of 0.8 millicoloumb/kilogram is connectable to a boom fitted to a vehicle, such as an aircraft, having a dc power supply. The apparatus comprises a nozzle constructed from a substantially non-conductive material and includes a spray tip designed to provide a hollow conical spray pattern. A support member extends from the nozzle and supports a charging electrode for inducing an electrostatic charge upon the liquid sprayed through the nozzle. The charging electrode attaches to the support member and is electrically connectable to the dc power supply. The charging electrode includes a cylindrical portion and a plurality of corona discharge members extending inwardly from a distal end of the cylindrical portion adjacent to the spray tip. The charging electrode is positioned to permit the hollow conical spray pattern to pass unhindered therethrough.

20 Claims, 2 Drawing Sheets

AERIAL SPRAYING APPARATUS

CROSS-REFERENCE TO RELATED APPLICATION(S)

This application claims the benefit of similarly entitled U.S. Provisional Patent Application No. 61/536,724, filed on 20 Sep. 2011, which is hereby incorporated herein by reference.

BACKGROUND OF THE INVENTION

The present invention is generally directed at spraying nozzles and systems for use in aerial sprayers or crop dusters. More specifically, the present invention includes an aerial spraying nozzle for inducing an electrostatic charge upon a sprayed liquid.

Aerial spraying has long been used as a means of applying herbicides, pesticides, fungicides and other forms of treatments to crops in the agriculture, horticulture and forestry industries. Aerial spraying is typically performed by modifying an aircraft to include a liquid reservoir in fluid communication with a plurality of nozzles held in place by one or more booms attached to the aircraft. The spray itself is usually formed by pumping a chemical liquid mixture contained within the reservoir through each nozzle to form a spray cloud of liquid droplets which deposit upon the crop upon flying thereover. It is known that in order to enhance the deposition of these droplets onto the crop, an electrostatic charge can be induced onto the spray upon exiting the nozzle. It is also known that the minimum charge-to-mass ratio needed to be induced on such sprays to observe any appreciable enhancement in deposition is 0.8 millicoulumb/kilogram (mC/kg).

There exist in the art several United States patents which have attempted to address the issue of inducing an electrostatic charge upon a spray during aerially spraying. Such examples include U.S. Pat. Nos. 4,560,107; 5,402,723; and 5,975,425. However, shortcomings in the prior art exist as extremely high voltage outputs are needed to induce a proper charge-to-mass ratio on the resultant electrostatically charged spray, ranging from at least 5 kV to 35 kV. Using such extremely high voltages to induce an electrostatic charge onto the spray has its inherent risks, including the possibility of inducing a high potential onto the aircraft in the event of equipment malfunction which could have deleterious effects, possibly fatal, when the pilot attempts to land. Further, for purposes of efficiency, it is desirable to impart upon the spray the maximum amount of charge per volt applied, which can lead to the employment of larger volumetric capacity aerial spray systems than what are currently being used.

There therefore exists a need in the art to provide an aerial spraying apparatus to achieve these goals, namely the ability to induce an adequate electrostatic charge onto an aerially sprayed liquid at relatively lower voltages than what is currently known, preferably less than 5 kV.

BRIEF SUMMARY OF INVENTION

An aerial spraying apparatus in accordance with the present invention includes a substantially non-conductive nozzle having a spraying tip to produce a hollow cone spray. The nozzle, attachable to a boom affixed to an aircraft, is in fluid communication with a reservoir, which supplies the nozzle with the liquid to be sprayed. A charging electrode, electrically insulated from the nozzle, is positioned proximately along a longitudinal axis of the nozzle concentric to an outlet of the nozzle spray tip. The charging electrode includes a hollow cylindrical portion, and a plurality of corona discharge members extending inwardly from a distal end of the cylindrical portion adjacent to the spray tip. The cylindrical portion and corona discharge members are positioned to permit the hollow conical spray pattern to pass unhindered therethrough. The charging electrode is in electrical communication with a dc power supply, which upon activation, induces an electrostatic charge on the spray being emitted from the nozzle. Supplying the charging electrode with less than 5 kV and at about 0.6 to 0.7 milliamps, the electrostatic charge induced onto the liquid spray is in excess of 0.8 millicoloumb/kilogram.

BRIEF DESCRIPTION OF THE DRAWINGS

The following figures are used herein in conjunction with the specification to assist in understanding the invention. The Figures are as follows.

DESCRIPTION OF THE INVENTION

Figure 1:
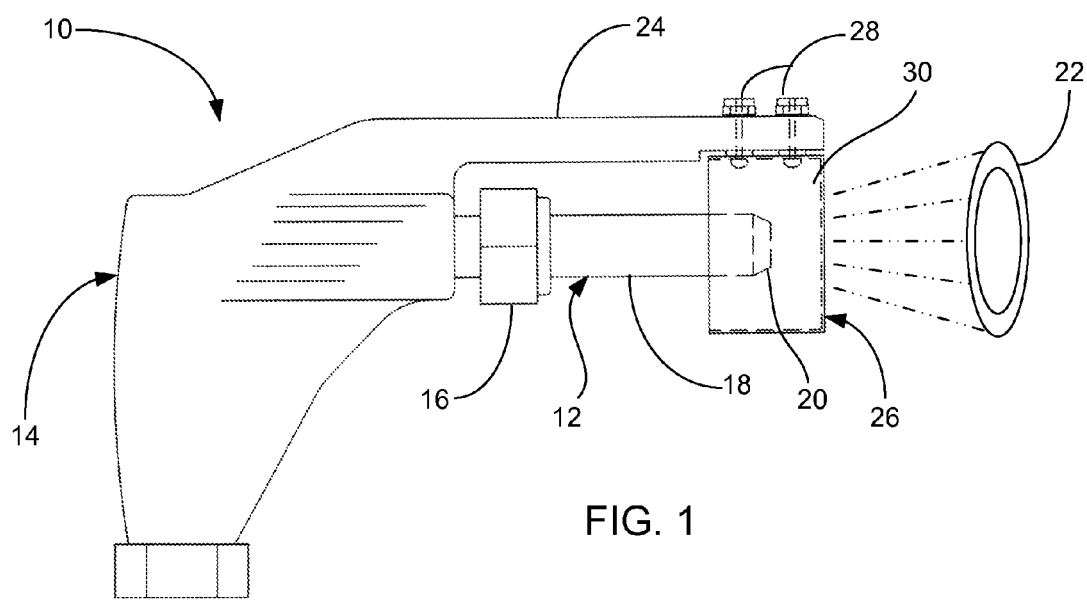
FIG. 1 is side view of an aerial spraying apparatus in accordance with the present invention.

An aerial spraying apparatus in accordance with the present invention is generally indicated at 10 in FIG. 1. The apparatus 10 generally comprises a nozzle portion 12 connectable to a body portion 14 by a threaded fastener 16. Both the nozzle portion 12 and the body portion 14 are preferably constructed of a substantially non-conductive material, including for example, synthetic plastics such as polystyrene (PS), polyvinyl chloride (PVC), polyethylene terephthalate (PET), polytetrafluoroethylene (PTFE), high-density polyethylene (HDPE), low-density polyethylene (LDPE), and polypropylene (PP). However, those skilled in the art will easily recognize that other non-conductive materials are well within the scope of the present invention as well. The nozzle portion 12 includes a hollow rod 18 constructed from the non-conductive material, approximately 4.5 cm in length and between 1 and 1.5 cm in diameter. Embedded within the hollow rod 18, a spray tip 20 is included for producing a hollow conical spray pattern 22. A conventional screen (not shown) may also be fitted within the hollow rod 18 for filtering particulate matter so as to not clog the spray tip 20, as is known in the art.

Figure 2:
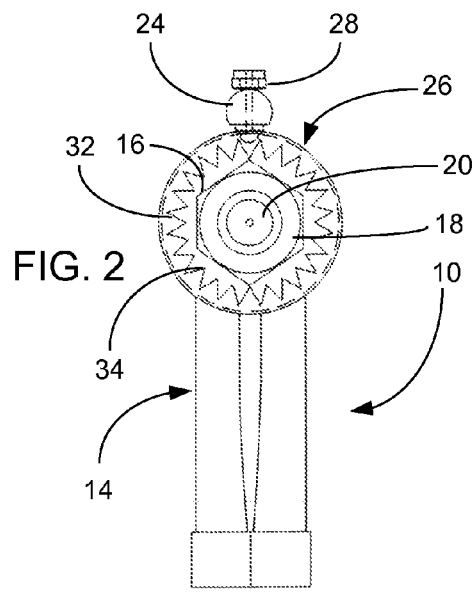
FIG. 2 is a front view of the aerial spraying apparatus in accordance with the present invention.
Figure 3:
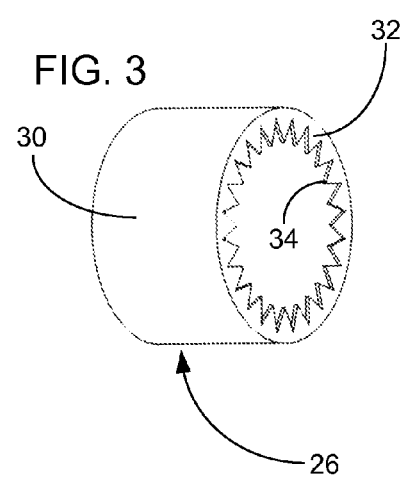
FIG. 3 is a perspective view of a charging electrode in accordance with the present invention.

Extending from the body portion 14 approximately parallel to the nozzle portion 12, a non-conductive support arm 24 is provided. The arm 24, which is preferably integrally formed from the body portion 14 of the same non-conductive material, supports a charging electrode 26. The charging electrode 26 is constructed of an electrically conductive material, preferably stainless steel. The charging electrode 26 affixes to the arm 24 by way of screws 28. The charging electrode 26 itself includes a cylindrical portion 30, approximately 2 cm in length and 3 cm in diameter, positioned about a longitudinal axis of the rod 18 concentric to an outlet of the spray tip 20. As best illustrated in FIGS. 2 and 3, the charging electrode 26 further includes a plurality of triangular corona discharge members 32 extending inwardly from a distal end of the cylindrical portion 30 adjacent to the spray tip 20. Each corona discharge member 32 extends from the cylindrical portion 30 approximately between 4 and 5 mm, but this can vary depending on the dimensions of the conical spray 22, as well as final placement of the cylindrical portion 30 relative to the spray tip 20. Each corona discharge member 32 extends approximately orthogonal to the cylindrical portion 30. However, it should be recognized that the angle of inward extension of each corona discharge member 32 in relation to the cylindrical portion 30 may vary and still be within the scope of the present invention. Each corona discharge member 32 terminates at a point 34, and the plurality of discharge members 32 form an inverted star pattern about the nozzle portion and spray tip. While as illustrated there are a certain number of corona discharge points 34, it is well within the scope of the present invention to provide more or fewer, depending on the size of the nozzle 12.

By employing the corona discharge members 32, it has been unexpectedly discovered by the present inventor that a more effective inducement of electrostatic charge onto the spray occurs at lower voltages than previously applied in devices of the prior art. Further, the corona discharge members 32 do not inhibit air flow properties of the nozzle 12 or the hollow conical spray 22. It has also been discovered that the minimum charge-to-mass ratio needed to effectively enhance droplet deposition of the electrostatically charged spray can be achieved at voltages beginning as low as 500 volts, with even more enhanced results occurring at 1,000 to 2,500 volts (1 kV to 2.5 kV). Thus, the preferred voltage range for inducing an electrostatic charge onto a spray utilizing the nozzle apparatus of the present invention is between 500 and 5000 volts. However, as the electrical resistivity of differing chemicals to be sprayed varies, the proper voltage to apply may vary.

Figure 4:
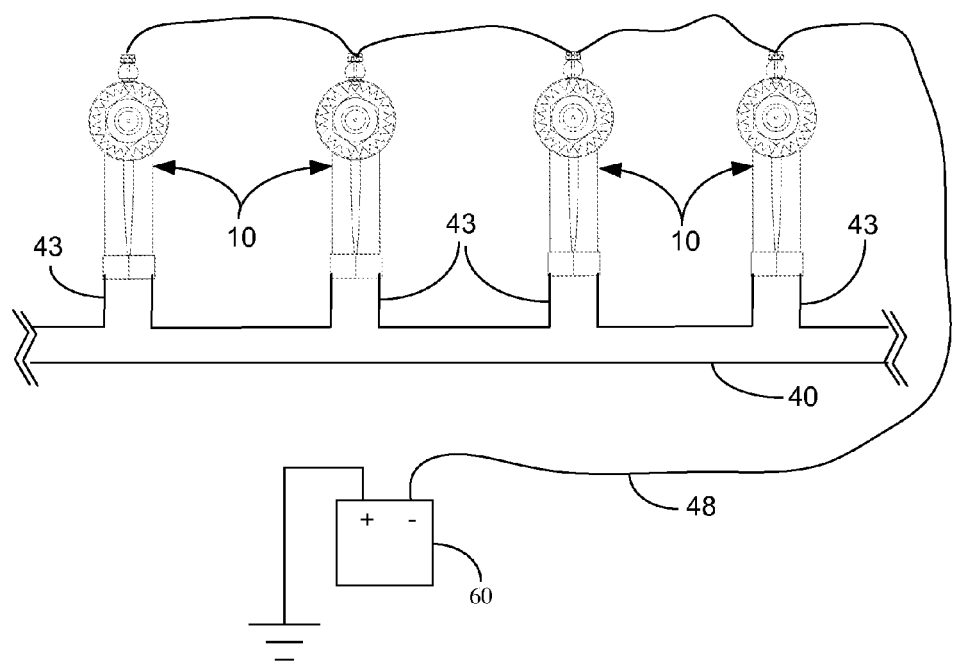
FIG. 4 illustrates an exemplary configuration of multiple aerial spraying apparatus in accordance with the present invention.
Figure 5:
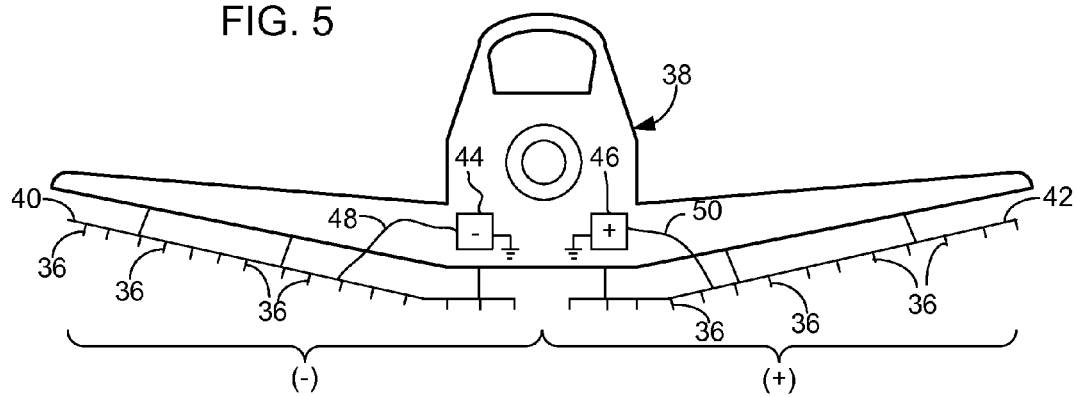
FIG. 5 illustrates an exemplary configuration of the aerial spraying apparatus as installed on an aircraft in accordance with the present invention.

As illustrated in FIGS. 4 and 5, a plurality of nozzle apparatuses 10 are attachable in fluid communication to a hollow boom 40, 42. Generally, at least one boom is provided on each side of the aircraft, preferably on the underside of the wings. Nozzle apparatuses 10 are mounted along each boom 40, 42, with the longitudinal axis of the nozzle tips parallel with the forward direction of the aircraft while in flight, as is understood in the art. The liquid fluid material for spraying is delivered to each nozzle 10 from a reservoir (not shown) through respective booms 40, 42 and conduit 43. Booms 40, 42 also provide the electrical ground connection to each nozzle set 36, through the aircraft frame extending up to the conduit.

To supply each charging electrode 26 with power, two independent dc power supplies 44 and 46 are provided. Each power supply preferably has an overall output of up to 3 milliamps and between about 500 V to 5 kV. The power supplies 44, 46 are used to generate both positive (+) and negative (−) charged spray polarities. Each power supply 44, 46 is contained on or within the aircraft 38 and connects directly to the aircraft's battery (not shown), such as an aircraft Bus voltage, typically 14 or 28 volt dc battery. Controls (not shown) are provided in the cockpit for independent operation and adjustment of output voltage from each power supply 44, 46. Insulated and electrically conductive wires 48 and 50 connect each charging electrode 26 to the respective power supplies 44, 46. As illustrated in FIG. 5, wire 48 supplies a charge of (−) polarity to the electrodes 26 of the nozzles 10 contained on the first boom 40, while wire 50 supplies a charge of (+) polarity to the electrodes of the nozzles 10 positioned on the second boom 42. Thus, the potential of all of the electrodes of the nozzles 10 on the first boom 40 will be of the opposite polarity than the potential of the electrodes of the nozzles 10 on the second boom 42. The remaining terminals of both power supplies are grounded to the aircraft frame. It should be noted, though, that the configuration as illustrated in FIG. 5 is for purposes of description and the polarity of power supplies 44, 46 can be interchanged such that the boom 40 carries a positive charge while boom 42 carries a negative charge.

To prevent the aircraft 38 from building up an electric potential during operation, the airframe corona discharge must be maintained at substantially zero. To accomplish this, the nozzles 10 of the first boom 40 spray charge-to-mass ratio should be identical to that of the nozzles 10 of the second boom 42, as is known in the art.

For any given aircraft 38 fitted with the spray system of the present invention, the flowrate is nearly constant during operation irrespective of what chemical is being used. As such, the Q/M ratio is nearly constant over time and thus the system can be considered as constant current. Using the present invention, once optimal charging characteristics for a given aircraft spray system are obtained, the output current can be increased or decreased in proportion to changes in the flowrate. As such, the present invention permits the capability of setting the current to the desired value prior to flight, on the ground, without flowing any chemical. This can be achieved through the use of a load bank 60, which is a self-contained, unitized, systematic device that includes load elements with control and accessory devices. Using the load bank 60, once the current is set for a given airplane and spray system, there is no need to change the settings in flight, per-flight or per-chemical-used basis. However, output current of up to 3 milliamps can be used for increased flowrates, which allows the system of the present invention to achieve up to three times capacity of conventional systems while maintaining the same Q/M ration. It is preferred that the amperage selected provide a minimum Q/M ratio greater than about 0.8 mC/kg, and more preferably that the charging amperage correspond to the maximum Q/M ratio. For most operations, this amperage is in the range of 0.6 and 0.7 milliamps.

Once the desired power output is obtained, the spray system of the present invention can be optimized to perform efficient aerial spraying which can be characterized as adjustable constant current. Using the present invention, once the current is set to achieve the desired Q/M ratio, the voltage automatically rises to the value that results in the desired Q/M ratio. This is advantageous in that using the system of the present invention, the pilot can simply set the current prior to flight. This output current is thus preset on one of the power supplies by the pilot. After the aircraft is airborne and ready to apply the spray formulation to a crop, field or the like, the power supplies 44, 46 are activated by a calibrated load bank, and the proper charge to each boom 40, 42 is supplied.

It is recognized there are multiple variations beyond what are outlined in the detailed description to accomplish the objectives set forth by the current invention. Further alternative embodiments provide additional utility of the device for the convenience of the user. As such, although the present invention has been described with reference to preferred and alternative embodiments, workers skilled in the art will recognize that changes may be made in form and detail without departing from the spirit and scope of the invention.

The invention claimed is:

1. An apparatus for spraying and inducing an electrostatic charge upon a liquid, the apparatus connectable to a boom fitted to a vehicle having a dc power supply, the apparatus comprising:

a nozzle constructed from a substantially non-conductive material connectable to the boom, the nozzle including a spray tip designed to provide a hollow conical spray pattern;

a support member extending from the nozzle; and a charging electrode to induce an electrostatic charge upon the liquid sprayed through the nozzle, the charging electrode attached to the support member and electrically connectable to the dc power supply, the charging electrode including a cylindrical portion positioned on a longitudinal axis of the nozzle concentric to an outlet of the nozzle spray tip and a plurality of corona discharge members extending inwardly from a distal end of the cylindrical portion adjacent to the spray tip, the cylindrical portion and corona discharge members positioned to permit the hollow conical spray pattern to pass unhindered therethrough.

2. The apparatus of claim 1 wherein the electrostatic charge induced onto the liquid spray is in excess of 0.8 millicoloumb/kilogram when 5 kV or less are supplied to the charging electrode.

3. The apparatus of claim 1 wherein the electrostatic charge induced onto the liquid spray is in excess of 0.8 millicoloumb/kilogram when 4 kV or less are supplied to the charging electrode.

4. The apparatus of claim 1 wherein the electrostatic charge induced onto the liquid spray is in excess of 1.0 millicoloumb/kilogram when less than 5 kV are supplied to the charging electrode.

5. The apparatus of claim 1 wherein the electrostatic charge induced onto the liquid spray is in excess of 1.0 millicoloumb/kilogram when 4 kV or less are supplied to the charging electrode.

6. The apparatus of claim 1 wherein the electrostatic charge induced onto the liquid spray is in excess of 0.8 millicoloumb/kilogram when 0.7 milliamps or less are supplied to the charging electrode.

7. An apparatus for spraying an electrostatically charged liquid, the apparatus connectable to a boom fitted to a vehicle having at least one dc power supply, the apparatus comprising:

a nozzle connectable to the boom, the nozzle constructed from a substantially non-conductive material, the nozzle including a spray tip designed to provide a hollow conical spray pattern;

a support member extending from the nozzle; and an electrically conductive charging electrode attached to the support member and electrically connectable to the at least one dc power supply to induce an electrostatic charge upon the liquid sprayed through the nozzle, the charging electrode having a hollow cylindrical portion positioned on a longitudinal axis of the nozzle concentric to an outlet of the nozzle spray tip and a plurality of triangular members extending inwardly from a distal end of the cylindrical portion adjacent to the spray tip, the cylindrical portion and plurality of triangular members positioned to permit the hollow conical spray pattern to pass unhindered therethrough, whereupon supplying the charging electrode with less than 5 kV, the electrostatic charge induced onto the liquid spray is in excess of 0.8 millicoloumb/kilogram.

8. The apparatus of claim 7 wherein the electrostatic charge induced onto the liquid spray is in excess of 0.8 millicoloumb/kilogram when 4 kV or less are supplied to the charging electrode.

9. The apparatus of claim 8 wherein the electrostatic charge induced onto the liquid spray is in excess of 0.8 millicoloumb/kilogram when 3 kV or less are supplied to the charging electrode.

10. The apparatus of claim 7 wherein the electrostatic charge induced onto the liquid spray is in excess of 1.0 millicoloumb/kilogram when less than 5 kV are supplied to the charging electrode.

11. The apparatus of claim 10 wherein the electrostatic charge induced onto the liquid spray is in excess of 1.0 millicoloumb/kilogram when 4 kV or less are supplied to the charging electrode.

12. The apparatus of claim 11 wherein the electrostatic charge induced onto the liquid spray is in excess of 0.8 millicoloumb/kilogram when 0.7 milliamps or less are supplied to the charging electrode.

13. An apparatus for spraying an electrostatically charged liquid, the apparatus connectable to a boom fitted to a vehicle having a dc power supply, the apparatus comprising:

a nozzle connectable to the boom, the nozzle constructed from a substantially non-conductive material, the nozzle including a spray tip designed to provide a hollow conical spray pattern;

a support member extending from the nozzle;

a cylindrical charging electrode attached to the support member, the cylindrical charging electrode including a cylindrical portion positioned on a longitudinal axis of the nozzle concentric to an outlet of the nozzle spray tip; and a plurality of corona discharge points extending inwardly from a distal end of the cylindrical portion adjacent to the spray tip, wherein the cylindrical charging electrode and plurality of corona discharge points induce an electrostatic charge upon the liquid sprayed through the nozzle, wherein the cylindrical charging electrode and plurality of corona discharge points are electrically connectable to the dc power supply, the cylindrical portion and corona discharge points positioned to permit the hollow conical spray pattern to pass unhindered therethrough.

14. The apparatus of claim 13, whereupon supplying the charging electrode with less than 5 kV, the electrostatic charge induced onto the liquid spray is in excess of 0.8 millicoloumb/kilogram.

15. The apparatus of claim 13 wherein the electrostatic charge induced onto the liquid spray is in excess of 0.8 millicoloumb/kilogram when 4 kV or less are supplied to the charging electrode.

16. The apparatus of claim 15 wherein the electrostatic charge induced onto the liquid spray is in excess of 0.8 millicoloumb/kilogram when 3 kV or less are supplied to the charging electrode.

17. The apparatus of claim 13 wherein the electrostatic charge induced onto the liquid spray is in excess of 1.0 millicoloumb/kilogram when less than 5 kV are supplied to the charging electrode.

18. The apparatus of claim 17 wherein the electrostatic charge induced onto the liquid spray is in excess of 1.0 millicoloumb/kilogram when 4 kV or less are supplied to the charging electrode.

19. The apparatus of claim 18 wherein the electrostatic charge induced onto the liquid spray is in excess of 1.0 millicoloumb/kilogram when 3 kV or less are supplied to the charging electrode.

20. The apparatus of claim 13 wherein the electrostatic charge induced onto the liquid spray is in excess of 0.8 millicoloumb/kilogram when 0.7 milliamps or less are supplied to the charging electrode.

\* \* \* \* \*